Figure 1:
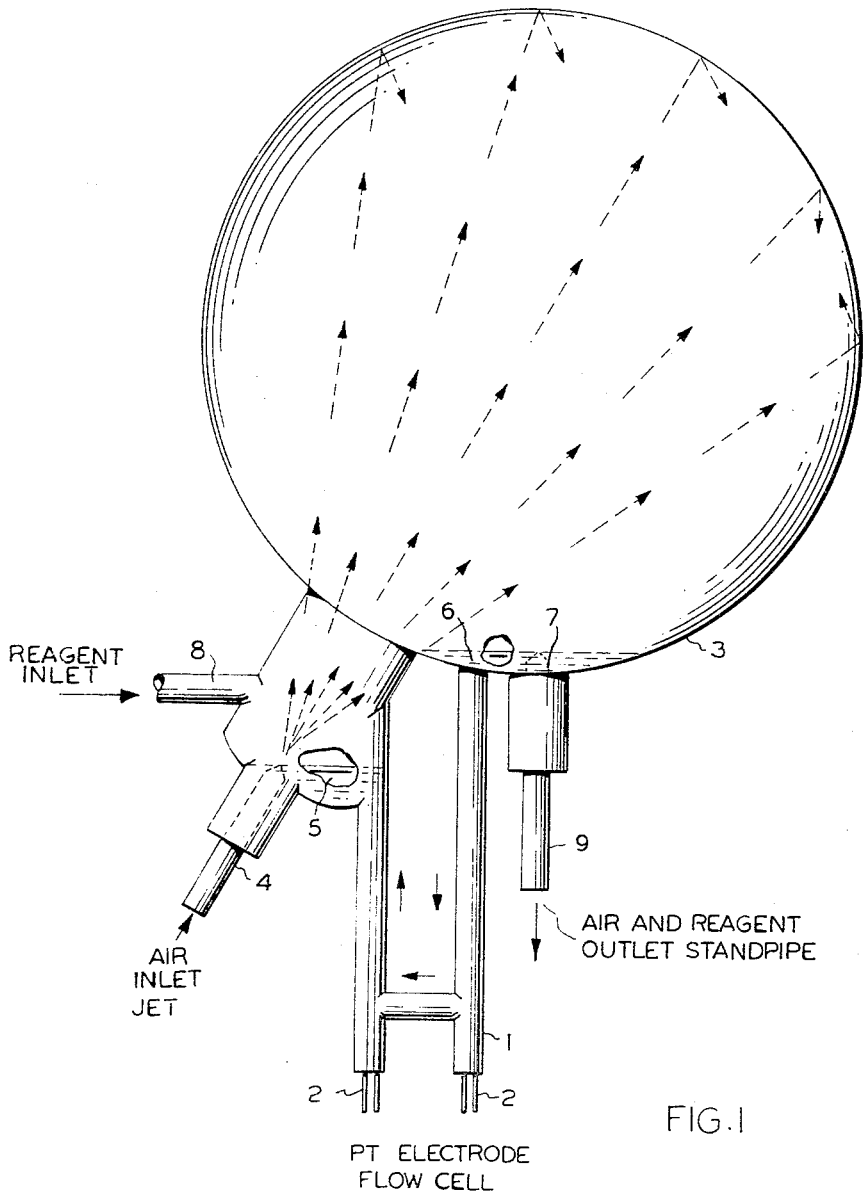

United States Patent Office 3,361,661
Patented Jan. 2, 1968

3,361,661
APPARATUS FOR ANALYZING GASES
Ferdinand Schulze, 3205 Fordham Road,
Wilmington, Del. 19807
Filed Sept. 23, 1964, Ser. No. 398,530
6 Claims. (Cl. 204—195)

This invention relates to methods and apparatus for the analysis and measurement of gaseous constituents in gas samples and, more particularly, methods and apparatus making possible continuous measurements of trace constituents such as ozone or sulfur dioxide or other gases.

The coexistence of ozone and sulfur dioxide in the atmosphere, particularly around urban areas, creates many perplexing problems relating to health, plant growth and environmental durability of industrial products. From thermodynamic considerations ozone and sulfur dioxide should react with each other, leaving only an excess of one or the other, however the extreme dilution of these gases in the atmosphere permits them to coexist for kinetic reasons. There is a question, therefore, regarding the environmental effects of ozone and sulfur dioxide in the absence or presence of the opposite member. This perplexing situation is aggravated by the fact that coexistence of ozone and sulfur dioxide complicates the analyses for these substances.

The complication arises from the fact that whereas liberation of iodine is the basis for numerous analytical procedures, both manual and instrumental, for ozone, sulfur dioxide, by reducing iodine, interferes in these procedures, a fact noted in the literature by such terms as "negative ozone." By the same token, analytical procedures based on reduction of iodine by sulfur dioxide will be in error due to presence of ozone.

Experience with a number of manual and continuous recording procedures based on iodine liberation for monitoring ozone content of the atmosphere has revealed many shortcomings. Inability to calibrate unequivocally in terms of ozone concentration is most frustrating. Lack of sensitivity, sluggish response in the case of continuous analyzers, uncertainty regarding the integrity of potassium iodide reagent, and requirement of frequent attention which militates against unattended operation for longer periods all contribute to the general dissatisfaction. Although many of these difficulties may be mainly problems of experimental technique, the overriding, basic problem is the interference of sulfur dioxide in ozone analysis. It is apparent, therefore, from both the standpoints of research on environmental effects of ozone as well as analysis for ozone that analyses for ozone alone may be relatively meaningless. Meaningful information about the atmospheric environment requires simultaneous monitoring for ozone and sulfur dioxide concentrations. Similar problems exist in control of ozone concentration in environmental chambers.

It is an object of this invention to provide a new and improved device and method for obviating the shortcomings of the prior art in analysis, measurement, and control of concentration of gaseous constituents.

It is a further object of this invention to provide a new and improved method and apparatus for accurately indicating the relative amounts of gaseous elements present in a gas sample.

It is a still further object of this invention to provide a method and apparatus for simultaneously measuring the relative quantity of ozone and sulfur dioxide in a gas sample.

Other objects and advantages of this invention will be apparent from the following description and drawings.

Iodimetric methods for ozone and sulfur dioxide require as their basis some means for measuring low concentrations of iodine in the absorption reagent. Coulometric, galvanic, and amperometric methods have been described. Basis for the method of my invention is the amperometric or conductimetric method described by Ehmert, "Ozone Chemistry and Technology," American Chemical Society, 1959, Advances in Chemistry Series No. 21, page 128, who showed that conductance between platinum electrodes of a potassium iodide solution containing a trace of iodine is linearly related to iodine concentration when potential below the decomposition potential of potassium iodide is applied. The principle involved here is depolarization of the platinum electrodes by iodine which allows flow of current. Current flow is linearly related to iodine concentration. Conductance is also a function of applied electromotive force, electrode area, rate of flow of solution past the electrodes, and electrolyte concentration, and these factors must be held constant.

I have found that rate of flow of solution is a very critical factor and that turbulent flow produces wild fluctuations in conductance, whereas streamline flow at a uniform rate produces steady conductance. I have discovered that this latter condition can be achieved according to my invention by flowing reagent through a conductivity cell 1 constructed of glass tubing as shown in FIGURE 1 and containing a pair of platinum wire electrodes 2 attached to and made a part of a gas absorber 3 or absorption vessel. The latter may be constructed from a 1 liter balloon flask. Air to be analyzed is admitted through a submerged jet having a 0.5 to 1 mm. orifice. Reagent 5 is picked up and atomized by the air jet 4 and the resultant liquid spray condenses on the walls of the absorption flask 3, and flows down to the entrance 6 of the conductivity cell 1 from whence it flows as shown by the arrows to the air jet 4 to be recycled. A constant liquid head 7 is maintained between the two arms of the conductivity cell 1, thus rate of flow is uniform and constant which fulfills the important requirement of uniform flow rate for steady conductance. Fresh reagent is pumped at inlet 8 to the absorber 3 at a uniform rate of 1 to 5 ml./ minute. Spent air and reagent leave the absorber through an adjustable standpipe 9 whose height is regulated to maintain suitable hold up of reagent 5, approximately 5 ml., in the absorber 3.

Figure 2:
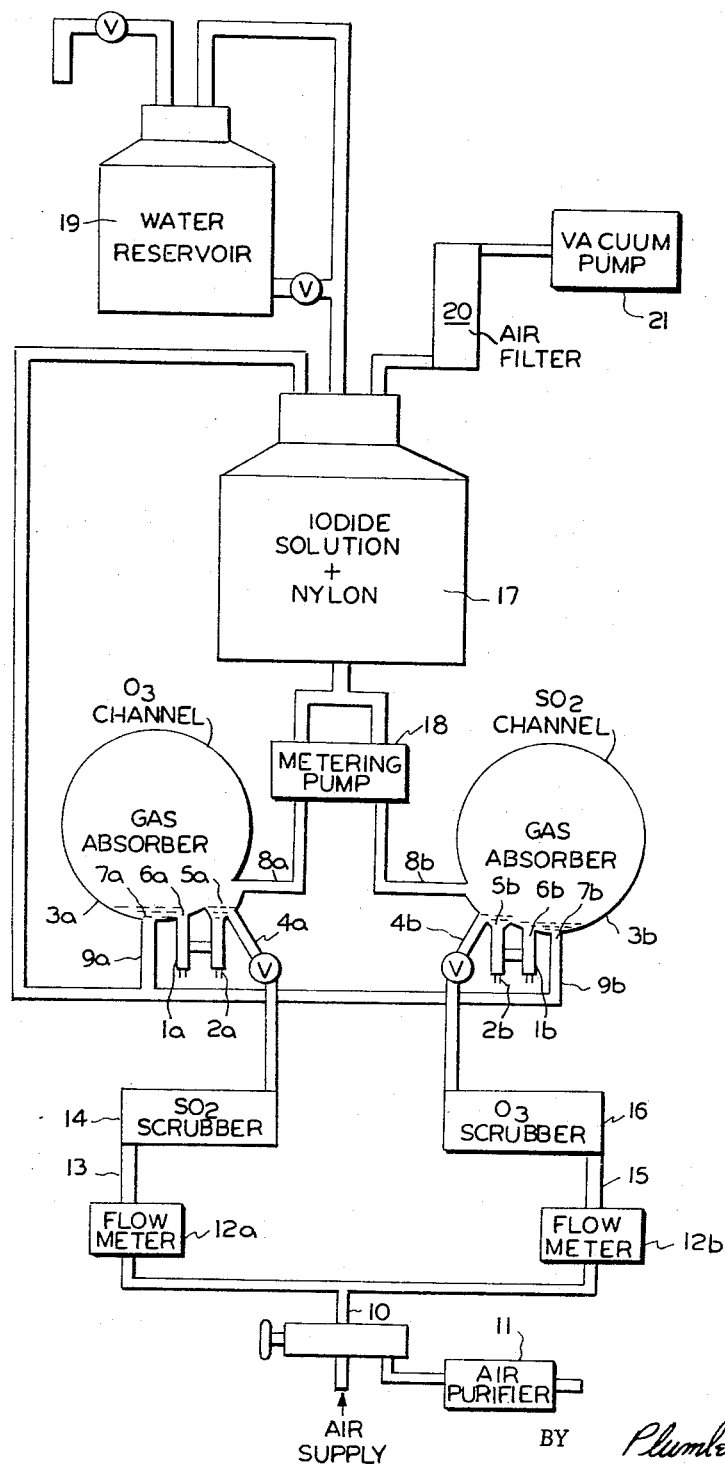

Schematic flow diagram of the preferred apparatus and method of the present invention is shown in FIGURE 2, wherein a combination unit is described which is capable of analyzing and/or monitoring two gases, such as ozone and sulfur dioxide, simultaneously. This apparatus consists of two essentially identical channels, one for ozone and the other for sulfur dioxide. To facilitate understanding of the operative principle, the description is divided into four sections, namely:

(1) Air flow system,
(2) Reagent flow system,
(3) Electrical measuring system,
(4) Electrolysis system.

Air flow system

Air is supplied to the system at 10 directly from the atmosphere to be analyzed or from an air purifier 11 containing a mixture of activated carbon and soda lime, which removes ozone and sulfur dioxide completely. Air from the purifier is used when it is desired to calibrate and standardize the unit. Air flow is metered to the system by means of rotameters and needle valves 12a and 12b.

Air admitted to the ozone channel 13 is filtered through a tube 14 containing quartz chips which have been soaked in a solution of equal weights of chromium trioxide, water, and 85% phosphoric acid. This removes sulfur dioxide but does not remove ozone.

Air admitted to the sulfur dioxide channel 15 is filtered through a tube 16 charged with granular ferrous sulfate heptahydrate. This salt effectively filters out ozone but absorbs no trace of sulfur dioxide.

Air flow in each channel is regulated to 3 liters/minute. Following contact with reagent in the absorbers 3a and 3b, spent air and liquid pass through standpipes 9a and 9b to the reagent reservoir 17. Spent air is filtered through a plug of nylon fiber in air filter 20 to protect the vacuum pump from iodine vapor which is volatilized in the system.

Reagent flow system

The reagent is neutral sodium iodide solution. Other iodide salts, such as potassium iodide, may be used but I prefer to use sodium iodide because it has less tendency to crystallize from solution than does potassium iodide, thus there is less tendency for it to clog ducts and tubing in the apparatus due to crystal growth. I have found that concentration of sodium iodide solution has little effect on performance of the analyzer. Solutions containing from 5 to 50 grams/liter of sodium iodide may be used. It is essential, however, that the reagent be neutral, i.e. close to pH 7. At this pH the reagent is not affected by nitrogen dioxide in concentrations normally found in the atmosphere. It is stored in the reagent reservoir 17 from which it is metered at constant rate by a two channel metering pump 18 to the gas absorbers 3a and 3b from which it is air lifted back to the reagent reservoir as previously described.

The reagent reservoir 17 is filled with nylon fiber which has the useful property of absorbing iodine quantitatively from water solution. This serves two very useful functions, i.e., it regenerates the reagent continuously so that replenishment of reagent is necessary only once or twice a year. The other function is in insuring the integrity of the reagent. Iodide solutions tend to be unstable, thus the nylon removes any free iodine formed due to reagent decomposition.

Water evaporates into the air stream and this loss is replaced from the water supply reservoir 19 which is connected to the reagent reservoir 17 as a "chicken watering" device, i.e. giving water to the system as the level in the reagent reservoir 17 falls.

Electrical measuring system

Figure 3A:
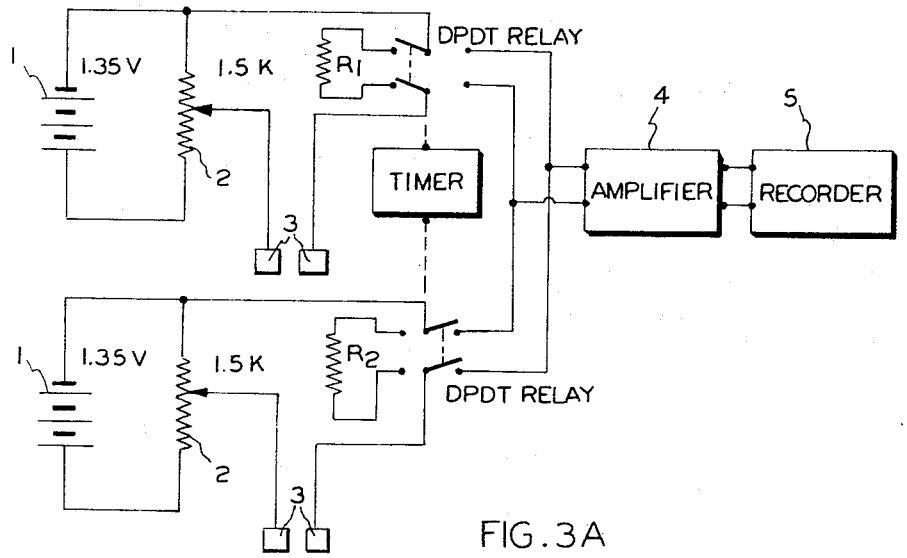

As indicated previously, iodine concentration is measured conductimetrically according to this invention. Low potential current (referring now to FIGURE 3a), from 5 to 50 mv., is supplied from a 1.35 v. mercury cell 1 and voltage divider 2 to the conductivity cell 3. A current flow at normal operating concentrations of iodine is between 0 and about 2 microamperes. This current is amplified by a small DC power amplifier 4 and current intensity is recorded by a 0–100 a. recording microammeter 5.

Because conductance is a linear function of iodine concentration, which in turn is stoichiometrically related to ozone concentration in the air, it is a simple matter to digitalize the system. For example, if iodine concentration equivalent to 10 parts of ozone is present, the microammeter can be set to 10 units on the meter scale either by adjusting measuring electromotive force at the voltage divider or by adjusting the amplification of the DC power amplifier.

In the preferred apparatus of this invention, a two-channel recorder is used to record the signals alternately from the ozone and sulfur dioxide channels.

Electrolysis system

Figure 3B:
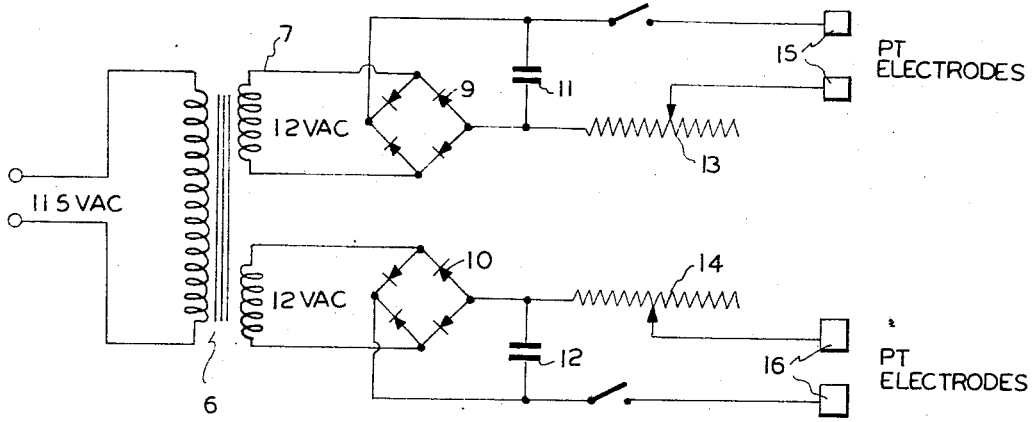

The electrolysis system, FIGURE 3b, has two functions. In the ozone channel it is used for standardizing the system in terms of ozone concentration. In the sulfur dioxide channel it is used for standardization as well as for generating iodine equivalent to a given concentration of sulfur dioxide. Standardization is in accordance with well-known coulometric principles. According to Faraday's Law, 96,501 coulombs of electricity liberate one gram atomic equivalent of iodine which in turn is stoichiometrically equivalent to one-half mole of ozone or one-half mole of sulfur dioxide. From this it can be calculated that a current of 13.33 a. will liberate iodine equivalent to 10 parts per hundred million by volume of ozone or sulfur dioxide in an air stream flowing at 1 liter per minute.

The electrolysis system consists of a small step down transformer 6 with two secondary coils 7 and 8, two small full wave rectifiers 9 and 10, two capacitors 11 and 12, two rheostats 13 and 14 for controlling current density, and platinum wire electrodes 15 and 16 located downstream in the other arm of the conductivity cell 1 previously described, in connection with FIGURE 1.

Standardization and calibration

The system is calibrated by switching the air intake 10 to pure air. Air flow is adjusted to the desired rate; in the preferred operation of this invention it is 3 liters per minute in each channel, i.e. 9a and 9b of FIGURE 2. Electrolysis current is adjusted to 40 a. in each channel. Iodine is thus generated in each absorber at a rate corresponding to 10 p.p.h.m./v. of ozone and sulfur dioxide. Conductance between measuring electrodes now increases and the meter pointer or recorder 5 of FIGURE 3a will indicate increasing current flow. In time generation of iodine will equilibrate with rate of iodine outflow in spent reagent and in air. At this point the pointer of the microammeter 5 will assume a steady state. Pointer deflection is adjusted to indicate 10 units on the meter scale for both ozone and sulfur dioxide channels. From this point, operation of the two channels differs.

Operation

The ozone channel is put into operation by switching air intake to the atmosphere being analyzed, and switching off the electrolysis current. If the atmosphere contains no ozone, the meter reading will drop to zero current indication. Assuming the meter reads zero left, the ozone zero will be at left scale. Digits from 0 to 10 on the meter scale now read 0 to 10 p.p.h.m./v. ozone.

The sulfur dioxide channel is also put into operation by switching the air intake to the atmosphere but the electrolysis current is left on in this channel. If the atmosphere being analyzed contains no sulfur dioxide, the meter will remain at the original calibration point which was arbitrarily set at the tenth scale division. This point is now the sulfur dioxide zero. If the atmosphere contains sulfur dioxide, an equivalent amount of iodine will be consumed and the conductance will decrease correspondingly. If sulfur dioxide equals or exceeds generated iodine, the meter will register zero conductance. The sulfur dioxide scale, therefore, reads from right to left, just the opposite of the ozone scale. In conventional operation the right hand margin of the recorder scale becomes the sulfur dioxide zero.

It will be apparent that both ozone and sulfur dioxide scales can be readily altered by adjustment of electrolysis current and meter deflection during calibration on pure air. Because ozone content seldom exceeds 10 p.p.h.m./v. in most parts of this country, the ozone scale is usually set at 0 to 10; however range can be expanded easily to 0–20, or 0–40 p.p.h.m. or even higher. Sulfur dioxide content often exceeds 10 p.p.h.m./v., therefore, the sulfur dioxide scale may be set for 0–20 or 0–40 p.p.h.m./v., or even higher to accommodate local conditions, by increasing the standardizing electrolysis current. Thus for 0–20 p.p.h.m., at air flow of 3 liters/minute, electrolysis current is set at 80 a. and for 0–40 p.p.h.m. it is set at 160 a. For still higher concentrations it is obvious that air flow can be decreased with respect to standardizing electrolysis current, or incoming air can be diluted with pure air. Conversely, for very low concentrations, the resolving power of the apparatus can be increased by setting the calibration points at 0–5 p.p.h.m./v. or even lower.

Because standardization is coulometric, it will be apparent that measurement is independent of rate of reagent flow. It is critical, however, that supply of reagent to absorbers must be absolutely steady and uniform to maintain correct calibration. Reagent flow in the preferred apparatus of this invention is from 1 to 5 ml./minute. When analyzing very low concentrations, it is advisable to use the lower rate of solution flow and to increase the flow for higher concentrations.

If it is desired to compare ozone, or sulfur dioxide, concentrations in two gas samples, both channels of the previously described combination unit can be equipped with the same preferential gas filters. This arrangement is useful when it is desired, for example, to compare ozone, or sulfur dioxide, concentrations at the inlet and outlet ports of reaction vessels or environmental chambers. It is of course unnecessary to set up this system as a dual-channel combination unit as previously described. The system may be arranged to have only a single channel designed to monitor either ozone or sulfur dioxide alone.

If it is desired merely to determine residual oxidant or reductant content of the atmosphere, a single channel of the above system can be operated without preferential ozone or sulfur dioxide filters. In this mode of operation, using pure air, the electrolysis current is set at a value corresponding to a designated ozone and sulfur dioxide concentration. The measuring system is then adjusted so that the meter pointer is set at midscale. On switching to outside air, deflection to right of midscale indicates excess of oxidant over reductant while deflection to left of mide-scale indicates excess of reductant.

*Preferential absorption of ozone and sulfur dioxide*

Succesful operation of the analysis system as described depends on quantitative removal of ozone and sulfur dioxide respectively without removal of the opposite gas. Ozone is readily filtered out of air by activated carbon any many other materials but it happens that sulfur dioxide is likewise absorbed by many of the same materials. Granulated gum rubber absorbs ozone readily and sulfur dioxide only slightly. I have discovered, however, that ferrous sulfate is an excellent material and that it removes ozone quantitatively but absorbs no trace of sulfur dioxide. Granulated ferrous sulfate heptahydrate, 4 to 10 mesh, may be used quite successfully even though in use the heptahydrate rapidly loses water to form a lower hydrate. I have found that this has no effect on its efficiency as a preferential ozone filter.

Effectiveness of ozone removal by the ferrous sulfate scrubber may be demonstrated by alternately placing the scrubber in and out of an air stream containing a trace of ozone. No trace of ozone will be detected by the analyzer when the filter is in the air stream. Nonabsorption of sulfur dioxide may be demonstrated by admitted purified air to which is added a trace of sulfur dioxide to the analyzer. Alternately placing the ferrous sulfate scrubber in and out of the air stream produces no change in indicated sulfur dioxide concentration.

Sulfur dioxide is removed by filtering through a bed of 4 to 10 mesh quartz chips which have been soaked in a solution containing equal weights of chromium trioxide, water, and 85% phosphoric acid. Following soaking, excess solution is drained off before loading into an absorption column.

The effectiveness of the sulfur dioxide filter may be checked by operating the ozone channel on purified air and standardizing coulometrically as hitherto described. The electrolysis current is, however, not turned off. A trace of sulfur dioxide may then be admitted with the purified air stream. Leakage of sulfur dioxide through the filter would be indicated by downscale movement of the recorder pen. It has been demonstrated that the chromium trioxide-phosphoric acid filter effectively removes sulfur dioxide. Nonabsorption of ozone may be demonstrated by admitting sulfur dioxide-free air containing a trace of ozone to the ozone channel while alternately placing the sulfur dioxide filter in or out of the air stream. No change in ozone concentration is observable when the filter is placed in or out of the air stream.

Low concentration of ozone, ca. 10–20 p.p.h.m., for the above tests may be obtained from a miniature ozonator constructed from an ozone producing lamp with ballast housed in a small aluminum Minibox. Low sulfur dioxide concentration, ca. 10–20 p.p.h.m., may be obtained by blowing purified air over, not through, 500 ml. distilled water to which has been added one drop of saturated sodium bisulfite solution in a 1 liter suction flask.

The ozone and sulfur dioxide filters are long-lived and need replacement infrequently. Exhaustion of these filters can be checked by the procedures described above for demonstrating their efficacy.

*Performance*

The apparatus of this invention is quite flexible from the standpoint of concentration range and sensitivity. It can be calibrated to measure 0 to 5 p.p.h.m./v. ozone or sulfur dioxide from zero to full scale on the recorder chart which signifies that difference in concentration down to 0.1 p.p.h.m./v. can be detected. Range can be expanded by simple adjustment of electrolysis current and adjustment of measuring electromotive force or amplification to digitalize meter readings. For higher concentrations it is, of course, possible to dilute the air sample by mixing it with pure air obtained from an activated carbon-soda lime filter.

Response to changes in concentration starts between 5 and 10 seconds. Full scale response, say from 0 to 10 p.p.h.m./v. or 10 to 0 p.p.h.m./v., requires about 20 minutes.

Stability of signal is very good after the instrument has been in operation for 24 hours. Because of initial slight drift in signal it is advisable to recalibrate after 24 hours' operation. After this it is necessary only to check the calibration once a week.

Water is evaporated by the air stream and this loss must be replenished. It has been found that a 2-liter water reservoir 19 of FIGURE 2 needs to be refilled with distilled water but once a week. The reagent need not be changed over long periods. The same is true of the nylon filter in the reagent reservoir 17 of FIGURE 2. Exhaustion of the nylon is indicated by complete orange or brown discoloration by iodine. A nylon filter was not exhausted after continuous use for over nine months in an experimental unit.

The platinum electrodes of the conductivity cell occasionally become "poisoned" for reasons not yet understood but thought to be caused by foreign matter being drawn in with the air. It is known that iron salts, for example, will poison the measuring electrodes. Poisoning is manifested by erratic signals and low conductance. When this happens, the electrode assembly should be removed from the absorber and rinsed with sodium bisulfite solution or concentrated nitric acid followed by water rinsing to restore the electrodes to prime condition.

As in other systems which are based on iodimetry, strong oxidizing agents such as free halogens and some peroxides, and reducing agents in addition to sulfur dioxide, can interfere with the measurement. Nitrogen dioxide, in concentrations normally found in the atmosphere, does not interfere since the reagent is neutral.

The system as described above may also be equipped with suitable relays or controller recorders to set off alarms if ozone or sulfur dioxide exceeds permissible limits and to control concentration of ozone and sulfur dioxide in environmental chambers.

The foregoing description and accompanying drawings disclose the preferred embodiments of my invention, but

I claim:

1. Apparatus for use in measuring the amount of a gaseous constituent in a gas mixture comprising a closed hollow vessel, a first means penetrating said hollow vessel for introducing a fluid reagent, a second means penetrating said hollow vessel for injecting a submerged jet of gas upwardly through said fluid reagent to pick up and atomize said reagent into a spray against the inner walls of said hollow vessel, a U-shaped tubing penetrating said hollow vessel containing a first and a second pair of electrodes, each within a leg of said U-shaped tubing, each leg having its opening into said hollow vessel below the surface of said fluid reagent and arranged to be immersed in said reagent and one leg having its opening at a point lower than the other, an adjustable gas and reagent outlet standpipe penetrating said hollow vessel to a point such that a constant liquid head is maintained between the two legs of the U-shaped tubing and means for connecting a source of electrical energy and indicating means to said first and second pairs of electrodes to indicate the degree of depolarization of said electrodes.

2. Apparatus for use in measuring the amount of a gaseous constituent in a gas mixture comprising a closed hollow vessel, a first means penetrating said hollow vessel for introducing a fluid reagent, a second means penetrating said hollow vessel for injecting a submerged jet of gas upwardly through said fluid reagent to pick up and atomize said reagent into a spray against the inner walls of said hollow vessel, a U-shaped tubing penetrating said hollow vessel containing a first and a second pair of electrodes, each within a leg of said U-shaped tubing, each leg having its opening into said hollow vessel below the surface of said fluid reagent and arranged to be immersed in said reagent and one leg having its opening at a point lower than the other, an adjustable gas and reagent outlet standpipe penetrating said hollow vessel to a point such that a constant liquid head is maintained between the two legs of the U-shaped tubing and means for connecting a source of electrical energy and indicating means to said first and second pairs of electrodes to indicate the degree of depolarization of said electrodes, means for maintaining a reservoir of reagent with pumping means attached for constant delivery therefrom of fluid reagent to said first means, means for recirculating fluid reagent and gas from said reagent outlet standpipe to said reservoir and means for filtering and discharging spent gas from said reagent reservoir.

3. Apparatus as described in claim 2 in which the fluid reagent reservoir is filled with nylon fiber for removing free iodine from the reagent and is connected to a water supply reservoir adapted to maintain the liquid level in said reagent reservoir.

4. Apparatus as described in claim 3, for measuring the amount of sulfur dioxide in a gas mixture, in which the fluid reagent is a neutral sodium iodide solution and the means for injecting a submerged jet of gas is operatively connected by a conduit to a filtering means, to which ferrous sulfate heptahydrate has been added, for removing ozone from the gas before it enters the hollow vessel as a submerged jet.

5. Apparatus as described in claim 3 for measuring the amount of ozone in a gas mixture in which the fluid reagent is a neutral sodium iodide solution and the means for injecting a submerged jet of gas is operatively connected by a conduit to a filtering means, which contains quartz chips which have been soaked in a solution of equal weights of chromium trioxide, water and 85% phosphoric acid, for removing sulfur dioxide from the gas before it enters the hollow vessel as a submerged jet.

6. Apparatus for simultaneously measuring the amount of ozone and of sulfur dioxide in a gas mixture comprising a first and a second closed hollow vessel which are both operatively connected to a two-channel metering, pumping means which, in turn, is operatively connected to a neutral sodium iodide solution reservoir filled with nylon fiber for removing free iodine from the reagent and connected to a water supply reservoir adapted to maintain the liquid level in said reagent reservoir, in each of both closed hollow vessels a first means penetrating said hollow vessel for introducing a fluid reagent, a second means penetrating said hollow vessel for injecting a submerged jet of gas upwardly through said fluid reagent to pick up and atomize said reagent into a spray against the inner walls of said hollow vessel, a U-shaped tubing penetrating said hollow vessel containing a first and a second pair of electrodes, each within a leg of said U-shaped tubing, each leg having its opening into said hollow vessel below the surface of said fluid reagent and arranged to be immersed in said reagent and one leg having its opening at a point lower than the other, an adjustable gas and reagent outlet standpipe penetrating said hollow vessel to a point such that a constant liquid head is maintained between the two legs of the U-shaped tubing and means for connecting a source of electrical energy and indicating means to said first and second pairs of electrodes to indicate the degree of depolarization of said electrodes, the said means for injecting a submerged jet of gas being operatively connected by a conduit to a filtering means which, in the case of the first closed hollow vessel contains quartz chips which have been soaked in a solution of equal weights of chromium trioxide, water and 85% phosphoric acid, for removing sulfur dioxide from the gas before it enters the hollow vessel, and, in the case of the second hollow vessel the filtering means containing ferrous sulfate heptahydrate for removing ozone before it enters the second hollow vessel as a submerged jet.

References Cited

UNITED STATES PATENTS

| 2,805,191 | 9/1957 | Hersch | 204—1 |
|---|---|---|---|
| 2,968,535 | 1/1961 | Arthur et al. | 204—195 |
| 3,038,848 | 6/1962 | Brewer et al. | 204—195 |
| 3,154,477 | 10/1964 | Kesler | 204—195 |

OTHER REFERENCES

Ehmert, "Ozone Chemistry and Technology," American Chemical Soc., 1959, Advances in Chemistry Series, No. 21, pp. 128–132.

JOHN H. MACK, *Primary Examiner.*

T. TUNG, *Assistant Examiner.*